United States Patent
Grosh et al.

(10) Patent No.: US 6,195,646 B1
(45) Date of Patent: Feb. 27, 2001

(54) SYSTEM AND METHOD FOR FACILITATING THE VALUATION AND PURCHASE OF INFORMATION

(75) Inventors: Gregory Grosh, Dallas; Christopher Michael Peter Bird, Irving, both of TX (US)

(73) Assignee: Data Junction Corp, Austin, TX (US)

(*) Notice: Subject to any disclaimer, the term of this patent is extended or adjusted under 35 U.S.C. 154(b) by 0 days.

(21) Appl. No.: 08/855,516

(22) Filed: May 13, 1997

(51) Int. Cl.$^7$ ................................................ G06F 17/60
(52) U.S. Cl. .......................... 705/26; 705/40; 380/4; 380/23; 380/24
(58) Field of Search .............................. 705/14, 25, 26, 705/39, 44, 40; 395/200.54; 380/4, 23, 24

(56) References Cited

U.S. PATENT DOCUMENTS

| | | | |
|---|---|---|---|
| 5,050,213 | * 9/1991 | Shear | 380/25 |
| 5,634,012 | * 5/1997 | Stefik et al. | 705/39 |
| 5,715,403 | * 2/1998 | Stefik | 705/44 |
| 5,724,521 | * 3/1998 | Dedrick | 705/26 |
| 5,752,238 | * 5/1998 | Dedrick | 705/14 |
| 5,754,787 | * 5/1998 | Dedrick | 395/200.58 |
| 5,768,521 | * 6/1998 | Dedrick | 395/200.54 |
| 5,870,562 | * 2/1999 | Butman et al. | 709/238 |
| 5,917,912 | * 6/1999 | Ginter et al. | 380/24 |

OTHER PUBLICATIONS

Hawkins, Donald; "Information metering: Paving the way for pay–per–view information"; Online; v.20 n. 4; pp. 36–41, Jul. 1996.*

Fletcher, Lloyd Alan; "DIALOG price restructrue evaluation: tentative steps on the road to value–based pricing"; Searcher; v. 2, n. 8 pp. 44–57, Oct. 1994.*

Smith, Mary Grace and Weber, Robert; "A New Set of Rules for Information Commerce—Rights–protection technologies and personalized–information commerce will affect all knowledge workers"; Communicationsweek; n. 583; p. 34, Nov. 1995.*

Raitt, D.B. and Knight, N. H.; "Creating new pricing models for electronic publishing"; Online Information 96 Proceedings; pp. 167–171, Dec. 1996.*

Vijayan, Jaikumar; "With WaveNet, users pay for what they see"; Computerworld; v28n15; pp. 37 and 46, Apr. 1994.*

* cited by examiner

Primary Examiner—Kevin J. Teska
Assistant Examiner—Demetra R. Smith
(74) Attorney, Agent, or Firm—Jenkens & Gilchrist (57) ABSTRACT

The present invention is directed to information valuation, negotiation and transaction. A supplier determines one or more pricing models to govern the purchase of some information. The price of that information is determined in accordance with a particular pricing model and a variety of dimensions and factors that modify the price pursuant to various purchase conditions.

28 Claims, 5 Drawing Sheets

SYSTEM AND METHOD FOR FACILITATING THE VALUATION AND PURCHASE OF INFORMATION

BACKGROUND OF THE PRESENT INVENTION

1. Field of the Invention

The present invention is directed to the art of information valuation and transaction, particularly to a system and method for facilitating the valuation of information and the sale of such information.

2. Background and Objects of the Present Invention

Since the introduction of the personal computer (PC) less than two decades ago, countless millions of such computers have been produced across the world, a large amount within the United States. Over the last decade these PCs have become increasingly interconnected to each other and to other such devices, e.g., mainframes, workstations and the like, via the Internet, which until recently was an arcane and primarily academic networking tool. Now, with computers becoming more and more mainstream and consumer oriented, users are demanding greater and greater functionality from their computers.

Concomitant with the technological breakthroughs facilitating the introduction of computers into the workplace and the home has been the societal shift from an Industrial Society to an Information-based Society. The storage, manipulation, transformation and transfer of information on PCs and other computers for a great variety of different applications and fields of endeavors has now become commonplace. A growing number of businesses operate solely within this informational realm.

A consequence of the Information Age is the accumulation of a vast repertoire of data spread across a myriad of computers worldwide, and the pace of such informational accumulation is, of course, accelerating. One difficulty in mining information from this ever-growing mountain of dispersed data, however, is that, it is stored in hundreds of different formats and thousands of variations, greatly hindering accessibility and usefulness. For example, the desired source data may be a large UNIX™ file in an obscure format on a remote mainframe computer and the user may want a small portion of that data appended to a pre-existing EXCEL™ spreadsheet on their own PC. Further, even with accessibility, the conversion of newly-acquired or legacy data in one format to another is a non-trivial endeavor, as is well understood in this art.

The technological impediments of access and conversion have thus far thwarted most data sales efforts. Nonetheless, applicants believe that this challenge will be met in the near future and the mountain of new and the currently dormant or legacy data will soon be made available, uncovering a diverse range of useful information to an equally diverse populace.

After the aforementioned technological difficulties of data access and transformation have been met and the digital (and analog) treasures unearthed, however, another and serious difficulty remains, one which the subject matter of the present application addresses: the valuation of that information. Unlike physical objects, e.g., a CD holding a computer program or song thereon, for which a value may be readily accessed or negotiated and a transaction made, intangibles, e.g., the pattern of bits comprising the digital signal representing the computer program or the song, present valuational and transactional difficulties, particularly in view of the fact that digital data may be replicated perfectly countless times.

Furthermore, with the rapid proliferation of the Internet, making information available to virtually anyone, anywhere in the world, the protection and exploitation of these informational resources will become increasingly important. Whereas protection is the realm of the intellectual property laws, exploitation will be driven by the marketplace, in which a supplier can supply a veritable inexhaustible resource subject to a potentially enormous demand. The present invention, therefore, is directed to facilitating the upcoming commoditization of information.

At present, few techniques exist for determining what to charge for any particular data and few mechanisms pertain to collecting funds from microtransactions, i.e., potentially millions of small value transactions. Currently, the principle resource for large, electronic information databases are on-line (public) database services such as Dialog Information Services, Mead Data Control (Lexis™/Nexis™ applications), Dow Jones Information Services, and the content/Internet Service Providers (ISP), such as Compuserve™, America Online™, Microsoft Network and the independent bulletin boards.

Each of the above providers, however, employ limited pricing models in valuating their data. One such model is data by the hour, i.e., the time the user spends browsing. Another is data by the byte, record, picture or other simple unit of measure. A third common model is data by subscription, i.e., a kind of "all you can download" buffet at a fixed price. Some providers utilize combinations of the above models.

In addition to the dearth of pricing models, at present there are only three popular models for the collection of money on the Internet. One is a VISA™/Mastercard™ secured transaction usually with a minimum amount of about $5–$10. Another is the aforementioned subscription or fixed fee for access and use, a form of pay-per-view. Lastly, there is an advertising model, ie., "free" access to the desired data, but subject to extensive advertisements provided with the data, the advertisers footing the bill for the service. None of these models, however, provide the capability to conveniently scale the transactions to much smaller amounts, e.g., $0.50 or less, and greater frequency, e.g., millions of transactions per day. In short, there is at present no convenient way to handle the sale of a small piece of data, e.g., a single icon, form, article, digitized picture, etc., for a small fee.

One service on the Internet, Wave Systems "Wave Interactive Network—Micro Publishing", www.wave.com, provides a hardware-based solution to the pricing of a piece of data, primarily artistic in nature, e.g., a digital image. This approach, however, is simplistic in that the price is fixed.

It is, therefore, apparent that there is a great need for a system and method for valuating a wide variety of information and conveniently selling such information.

It is, accordingly, an object of the present invention to provide a system and method for facilitating the valuation and sale of information on a public or private network.

It is also an object of the present invention to facilitate both the vending and purchase of information by simplifying the interface to accomplish the valuation and purchase tasks.

SUMMARY OF THE INVENTION

The present invention is directed to information valuation, negotiation and transaction. A supplier determines one or more pricing models to govern the purchase of some information. The price of that information is determined in accordance with a particular pricing model and a variety of dimensions and factors that modify the price pursuant to various purchase conditions.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENTLY PREFERRED EXEMPLARY EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
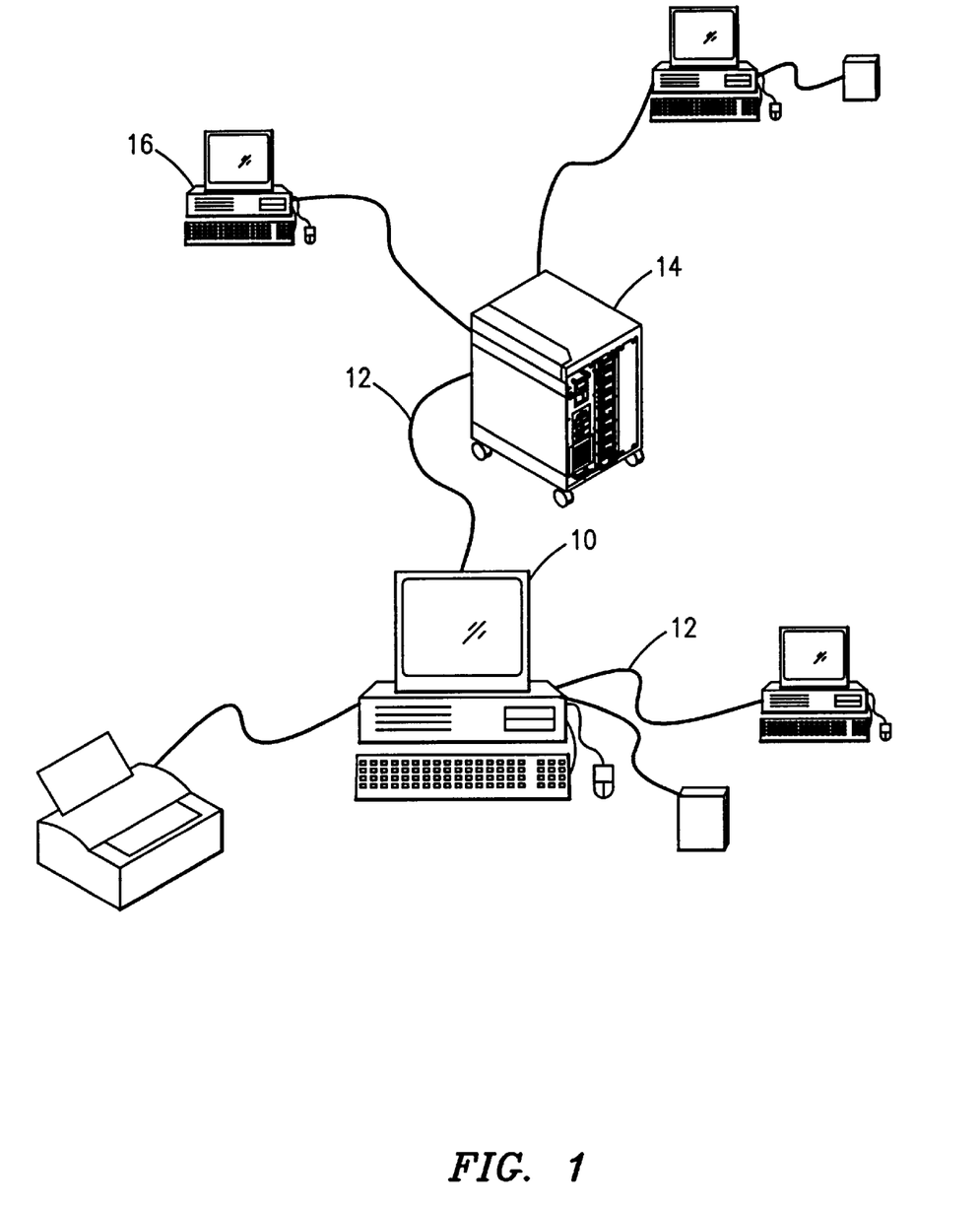
FIG. 1 is a schematic diagram of a computer network system and apparatus for employing the valuational and transactional features of the present invention.

With reference now to FIG. 1, there is illustrated a computer network, e.g., a portion of the Internet, where a first user at a first PC 10 may communicate, via respective transmission wires 12 and intermediary or server computers 14, to another user at a second PC 16. In accordance with the principles set forth in the present invention, discussed in detail hereinafter, the first user may offer information for sale pursuant to one or more pricing models and the second user may purchase, even negotiate or bargain, for such information in accordance with those (or other) models.

Figure 2:
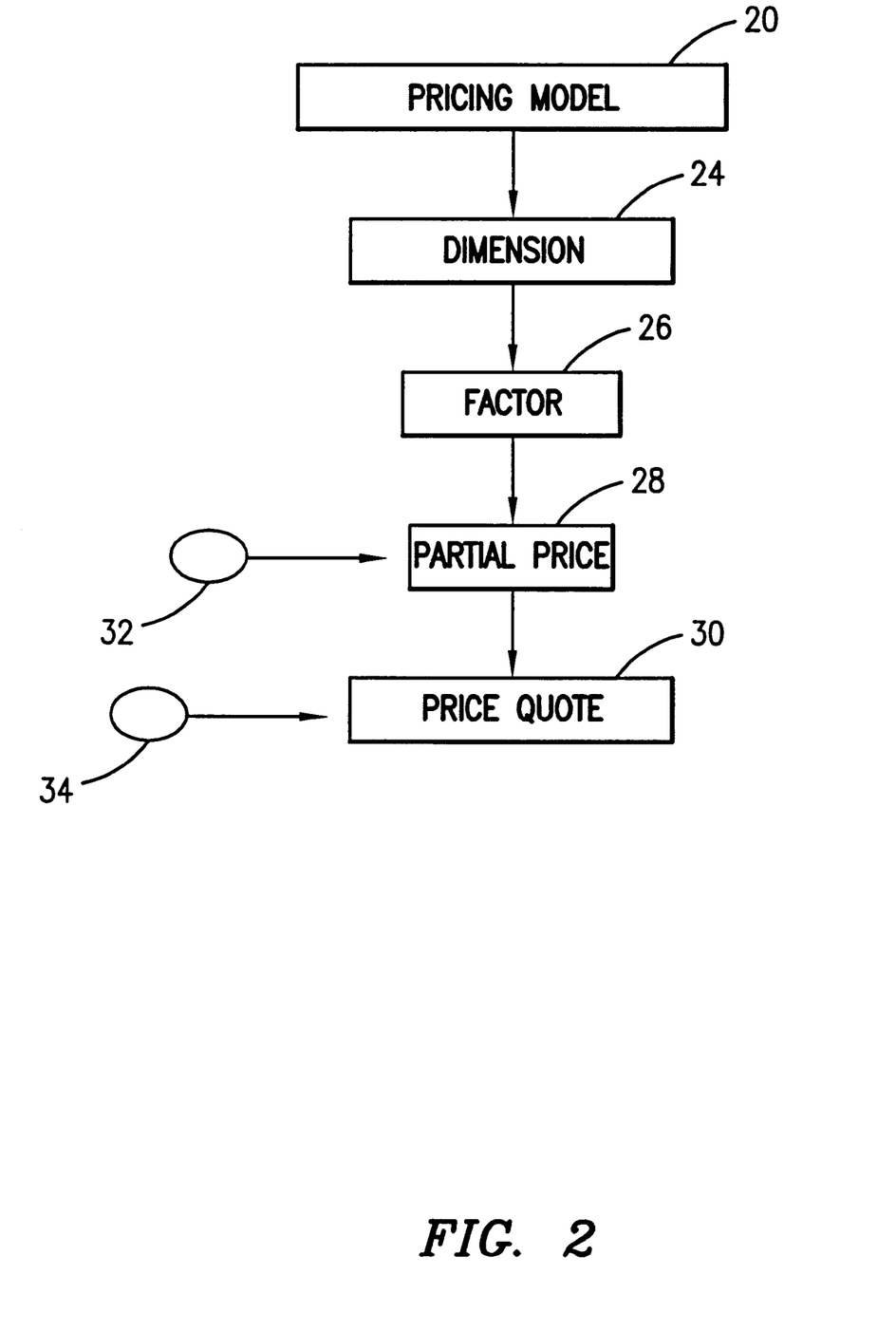
FIG. 2 is a schematic diagram illustrating steps followed by the system and apparatus of FIG. 1 in practicing the method of the present invention.

With reference now to FIG. 2, after the system and method of the present invention determines which particular pricing model (box 20) or models govern the information transaction, dimension (box 24) and factor (box 26) considerations apply, each of which may modify the value of a pricing unit set forth in the pricing model, as will be discussed in more detail hereinafter. It should be understood that the application of the various dimensional and factor aspects of the present invention is intended to mimic the sale/purchase considerations faced by a typical seller and consumer in a conventional retail context and generate a partial price (box 28), the sums of which constitute a price quote (box 30), as also discussed hereinafter.

Instead of the fixed pricing models discussed hereinbefore in connection with some existing systems, the pricing models of the present invention offer great flexibility through the concept of dimensions, one or more of which are used under a given pricing model (box 24). One simple example of a dimensional pricing aspect is volume (VOLUME), i.e., the amount of digital information desired as measured in relevant units based upon the type of information to be priced, e.g., in units, records, bytes, fields, pages (HTML and otherwise), pixels, sets, tables, objects, rows, domains, tracks, characters, screens, cycles, waveforms, seconds, minutes, hours, days, bits and other units of measure relating to the volume, quantity or size of the desired digital information. It should be understood that the VOLUME dimension may also refer to the percentage of volume selected compared to the total volume of the source, for example, a magazine article may constitute 10% of the digital information within the magazine.

Each dimension, such as volume above and subsequent dimensions discussed hereinafter, may be combined or recombined in any fashion to produce a desired pricing effect, which will also be discussed in more detail hereinafter. Further, each dimension may contain a plurality of discrete factors, variants or variables that further modify the pricing mechanism. Each dimension can contribute multiple factors, or portions of the price, in the calculation of the final price(s), i.e., in the partial price (box 28) and price quote (box 30) calculations. Furthermore, these pricing factors can be established through static (pre-execution) and dynamic (during execution) configuration schemes to allow for the richest possible pricing mechanism.

Another useful dimensional aspect is freshness or timeliness (TIMELY) of the pertinent data, i.e., the age of the digital information relative to its moment of creation. An account balance may refer to the absolute up-to-the-moment balance or to the balance as of last night at midnight or any specific time in the past or a series or sequence of the same balance over time. The pricing factor contributed by this dimension may price the digital information in any fashion based on this information. More current ("fresher" or more "timely") digital information may be more expensive, less expensive or whatever is desired to achieve a given the desired pricing effect. For example, stock quotes under 5 minutes old may be considered timely and more valuable than the same quotes an hour, a day or a month later. Conversely, a movie or film may appreciate in value after receiving an Oscar nomination. It should be understood that this aspect may be implemented dynamically, e.g., a function of time such as IF time (current)−time (data)>X, THEN surcharge, else no extra fee.

A third dimensional aspect relates to the seller's prior (PRIOR) experience with that purchaser, subscriber or a purchaser fitting a particular protocol. In particular, any specific knowledge obtained of this purchaser's past experiences with this supplier can be used by the system and method of the present invention when determining the pricing of new or additional digital information. For example, variables used in implementing this dimension were set and established in a prior transaction. It should be understood by those skilled in the art that this dimensional feature may be implemented in cookie form within the customer's own computer system and utilized dynamically at the time of information valuation and transaction.

A fourth dimensional model may be termed enumeration or sampling (SAMPLE). This dimension refers to a scheme used for the extraction of a sub-set of the digital information that has been selected for order using any of several methods for enumerating selected items, e.g., statistical sampling, min/max values with domains of the data, 1st, 5th, or every 5th occurrence of something in the digital information. The fact that sampling was used to select the digital information to be ordered may result in some pricing factor to be applied.

A fifth dimensional aspect relates to the quality (QUALITY), grade, reliability or rating of the information and its source, and each specific type of digital information may have one or more factors relating to the quality of that digital information. For example, digital information such as an audio signal has various sampling rates, pictures have various resolutions and moving images have frames per second. Variations among these rates, resolutions and frames may be valued differently, and some types of digital information may utilize multiple factors. Reliability may refer to the competency of the source supplier of the data to have provided like or similar data in a highly reliable fashion over time and therefore require a different reliability factor for its desired pricing effect. There are rating systems being developed and entering the market that rate certain types of digital information for purchasers. This dimension may take that into account for a desired pricing effect.

A sixth dimensional aspect pertains to the pricing models used by one's competitors (COMPETITION). In other words, information about the pricing of like or similar digital information currently offered by one or more other suppliers of the same or similar digital information may be factored into the determination of the pricing of this digital information at this time. For example, if a competitor's price is 10% or less under the supplier's price, then the supplier may match. Conversely, if the competition is charging more, the supplier may seek more also.

A seventh dimensional model pertains to the immediacy or non-immediacy of data delivery (DELIVERY). In other words, if the order need not be fulfilled immediately, the delay could invoke a different pricing effect. Conversely, if immediate delivery is requested, a premium could be charged. For example, a lengthy download of information, e.g., a movie, could cost much less if downloaded during off-hours instead of during peak hours.

An eighth dimensional aspect relates to demand (DEMAND), a function of the rate at which some digital information is selling, applying some multiplier or load factor such as used by airlines to increase/decrease a standard rate. For example, a purchaser may jump to the head of a queue of other purchasers by paying a fixed fee or applying some multiplier to the data price. Since many data items may be very inexpensive, the preferred mode of payment in most transactions would be a fixed fee, known by the purchaser as the cost of overcoming the demands of others.

A ninth dimensional aspect pertains to an external (EXTERNAL) value, ie., an additional adjustment or factor to achieve the desired pricing effect through an external interface, for example, with reference again to FIG. 2, an unknown outside factor from an outside source 32. Such an outside factor may override the other factors (box 26) without the need to reconfigure the calculation, e.g., adding an additional or different partial price component in view of an unknown external event such as the stock exchange closing early. A partial price component, its basis and description may be received (box 28), and a component identifier assigned in sequence, such as in the twelfth dimensional aspect hereinafter, for further modification per the desired pricing effect.

A tenth dimensional aspect relates to dynamic (DYNAMIC) configuration, where at execution time, based upon known forces and events outside of this pricing system, one or more factors of one or more dimensions in one or more pricing models may be modified. In other words, the pricing configuration is modified on the fly, adjusting the factor settings based upon a known event, e.g., a known period of time, as discussed above in connection with the freshness dimension, such as periodic stock quote updates.

An eleventh dimensional aspect concerns completeness (WHOLE), i.e., prices are based upon whether the total desired set of digital information is available from the suppliers at hand. For example, in downloading legacy data spanning many years, the data for 1939 may be missing from that source, but which may be available from others. Consequently the incompleteness may affect the price of the data collection in view of the potential need for further purchases from others.

A twelfth dimensional aspect pertains to a totally expression-based dimension, e.g., an algebraic equation or formula. For example, as in a spreadsheet, data in various columns and rows within a table may be combined in a particular manner, creating a new value, e.g., value=(row=X, column=Y)×(row X, Y+1)−(row X, Y+2).

It should additionally be noted that the processing of the information may involve a fee (FEE), this cost of transaction may change by a fee-setting device 34, as shown in FIG. 2. It should further be noted that even though the information processed may be free, a transactional fee (FEE), however small, has occurred and may be due, as determined by the fee-setting device 34.

Figure 3:
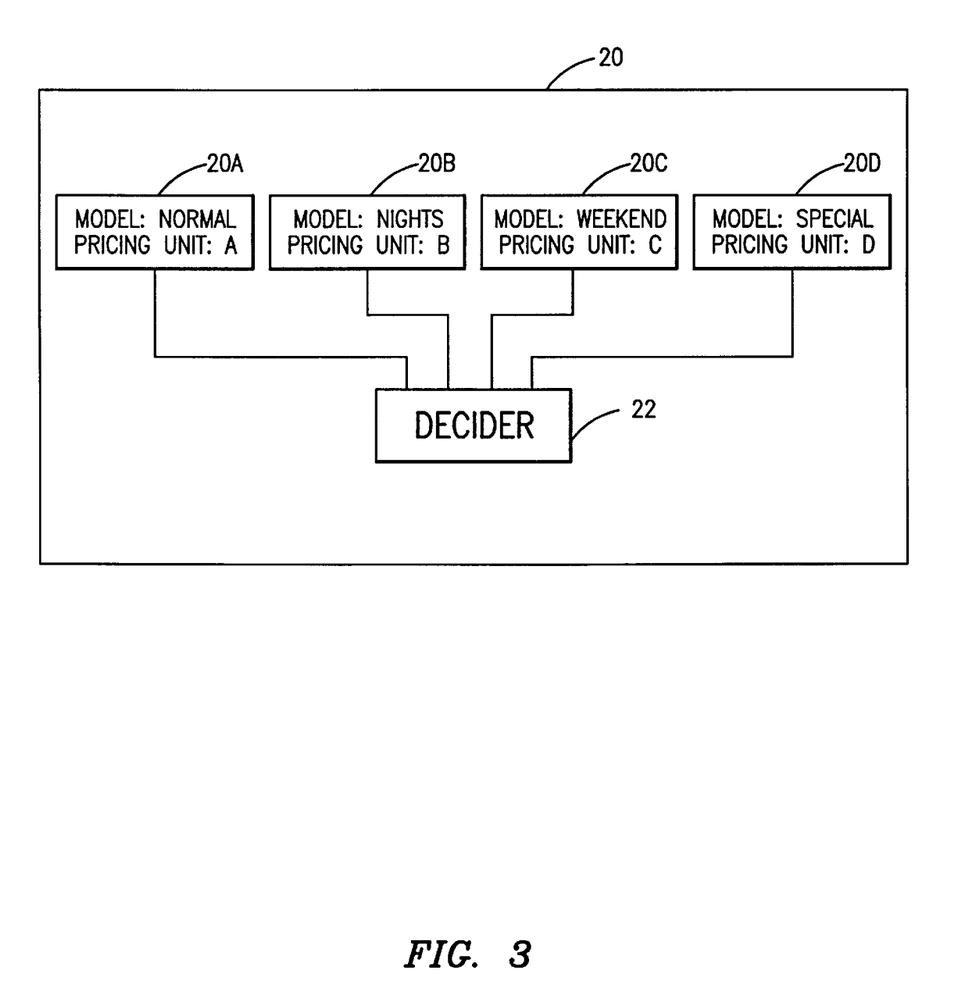
FIG. 3 is a schematic diagram further illustrating the pricing model configuration shown in FIG. 2.

With reference now to FIGS. 2 and 3 there is further illustrated a general model for valuating information in accordance with the present invention. At the top level is the aforementioned pricing model 20, which a seller may configure for particular circumstances, typically time/day restrictions. For example, with particular reference to FIG. 3, a "normal" pricing model for an informational product (box 20A) may be defined and active on weekdays between 0800 and 1700, i.e., the seller's normal business hours, a "nights" pricing model (box 20B) may be active after-hours on weekdays, a "weekend" pricing model (box 20C) may be active on all other times, and a "special" pricing model (box 20D) may be implemented at specific times, e.g., a sale or coupon offering between 1200 and 1300, or under other circumstances, e.g., within particular geographical areas.

It should be understood that the aforementioned pricing models 20A–20D, each instantiated by an information purveyor, may operate via an interactive session between a user, e.g., the first user (purchaser) on computer system 10 in FIG. 1, and the supplier through an interface on the second computer system 16. A special class of pricing models 20, however, may be invoked under extraordinary or unusual circumstances. For example, if VOLUME is a key consideration by a buyer, e.g., they want the entire database or 1,000 copies of a given unit, then that factor, i.e., 1,000 units, may prevail over the aforementioned normal top-down pricing models, which may be unit oriented, as opposed to the above bottom-up, attribute-driven "negotiation stance" model. If a negotiation model applies, a "special" subset (box 20D) of the aforedescribed pricing models 20, is selected and special factors applied, the particularities of which the purchaser may ascertain by a negotiation.

It should further be understood that whereas the aforedescribed interactions may involve an exchange between two human users, e.g., between users at the first 10 and the second computer systems 16, respectively, the interactions and negotiations between the two systems need not involve humans at either end. For example, the purchaser may instruct an intelligent agent or bot to interact with the buyer interface, which may itself activate its own agent or bot to mediate the exchange, each agent subject to a particular set of negotiation parameters set by the human implementer. Accordingly, negotiations may be ad hoc in nature and involve substantial back and forth offers and counteroffers until the parameters of one of the transacting parties is exceeded. In this manner, it should be understood that the pricing models or protocols 20 may be customized to suit a particular negotiation stance.

With further reference to FIG. 3, there is shown a representation of multiple pricing models 20A–D instantiated by the seller, each connected to a decider 22 that determines which model 20 applies in a given instance. It should be understood, however, that in a preferred implementation of the present invention, the aforementioned pricing models 20A–0D exist contemporaneously, i.e., they are each instantiated at all times. The determination of which of the instantiated models is active and applies to this situation is made dynamically, preferably at a later point in the process, i.e., at the partial price (box 28) stage, as shown in FIG. 2.

Upon determination of the correct pricing model to apply, e.g., the normal model (box 20A), the aforementioned dimensions and factors may then be utilized to modify a pricing unit associated with that model, e.g., a generic digitized image of a particular size is priced at 10¢ or a high resolution replica of a portion of Michelangelo's Sistine Chapel is priced at 25¢. It should be understood that the pricing unit is preferably a number representative of the value of the information in question, e.g., similar to fare construction units in airline parlance. The pricing unit, and all dimensional modifications made thereto, may then be converted into a currency of choice, e.g., the supplier's or purchaser's.

For example, if a magazine supplier is offering their magazine (and portions thereof) to buyers via the system and method of the present invention, the particular pricing model, e.g., the normal one (box 20A) in FIG. 3, may be activated. The supplier can set a plurality of the aforementioned dimensional aspects and factors applicable in a transaction, e.g., the variables VOLUME, TIMELY, PRIOR, DELIVERY and DEMAND may be utilized and assigned values. VOLUME represents the amount, e.g., percentage of the indicated magazine desired, such as a particular article therein. TIMELY represents the issue date, where new or current issues are more valuable than previous issues. PRIOR indicates that the data requester is a former customer, such as a subscriber, who may receive the information free. DELIVERY indicates the immediacy of the need, where immediate attention may be accorded a higher value than a queued or off-time delivery need. Lastly, DEMAND indicates any enhanced value to be accorded the data due to heightened interest or limited accessibility to the data. It should be understood that other variables may be utilized in addition to, instead of or in different combinations with the above variables.

In setting the above variables, e.g., the pertinent dimensions to logical one and the others to logical zero, the supplier not only determines the values of the variables, but also the order in which they are applied, all of which affects the pricing mechanism. In addition, by providing a plurality of variables and a particular ordering, the seller is in effect allowing for a negotiation based upon these variables, whereby the purchaser may modify their stance to obtain a lower price, such as requesting off-hour DELIVERY. For example, the aforementioned magazine supplier may set forth the following variable order, DEMAND, DELIVERY, PRIOR, TIMELY and VOLUME, as illustrated in FIG. 4.

Figure 4:
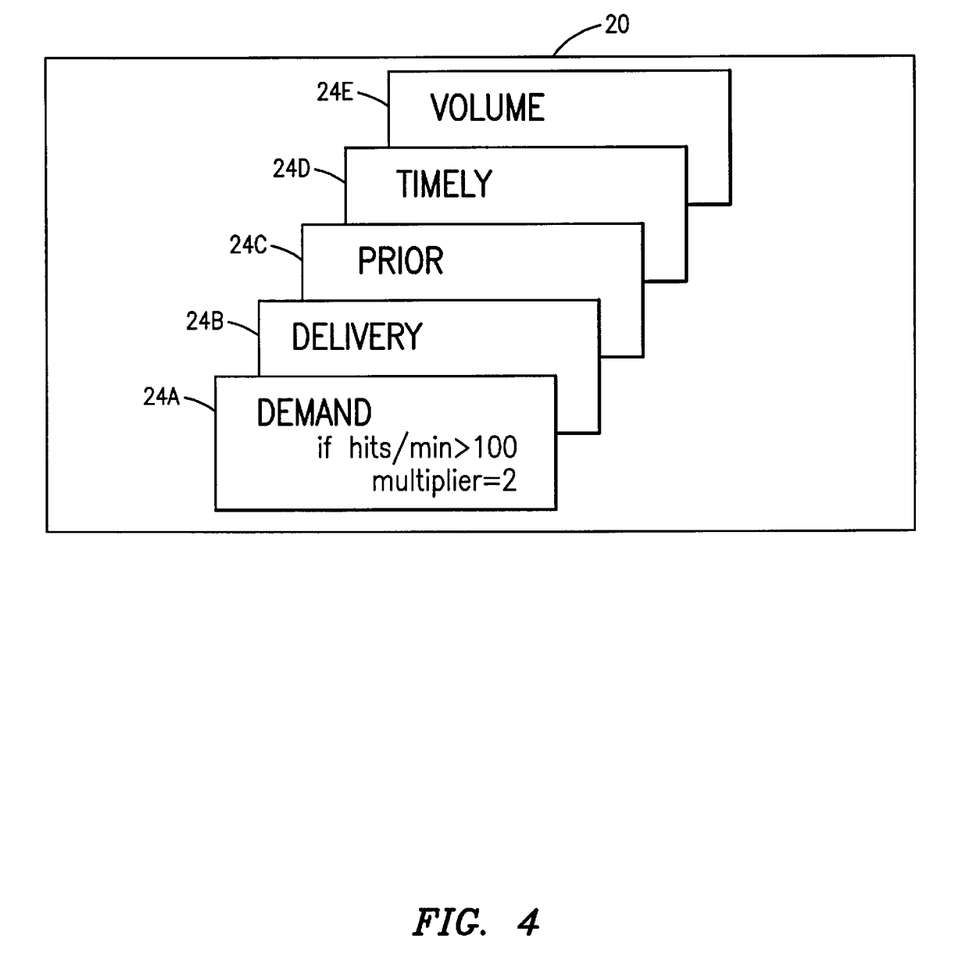
FIG. 4 is a schematic diagram further illustrating the dimension configuration shown in FIG. 2.

With reference now to FIG. 4, if the item is in DEMAND (box 24A), e.g., as dynamically ascertained by the number of website hits within a particular time period (hits/min>100), then the pricing unit value associated with the magazine may be increased by a multiplier or an additional cost to account for the increased demand and strain on system resources. If immediate DELIVERY is requested, e.g., outside of the normal transmission protocol, then another multiplier or additional cost may be added for this service. Even though a subscriber or regular user (PRIOR) may ordinarily obtain the magazine at no cost, should they want their issue out of turn, then the above increased costs may be applicable. If the desired magazine is TIMELY, i.e., a more valuable recent issue or conversely a less valuable older issue, then a multiplier or incremental/decremental additional cost may accrue. For example, a non-subscriber may want the most recent magazine, for which they should pay full price (a multiplier of 1) but an older magazine may warrant a slightly lower (0.75 multiplier for magazines several weeks or months old) or much lower (0.5 for magazines years old) cost consideration. Lastly, if only a portion (VOLUME) of the magazine is requested, then a portion of the entire price may be in order, e.g., a 0.5 multiplier. It should be understood, of course, that these values are representative only and the supplier may determine other orderings or valuations in accord with the particularities of their business and information supplied.

Thus, a purchaser, either in person or through an intelligent agent as described, seeking a magazine from the aforementioned supplier may then interface with a seller pursuant to the system and method of the present invention and determine the seller's asking price for the magazine. For example, if the magazine is TIMELY but not in DEMAND, a subscriber may obtain a duplicate copy and avoid DELIVERY surcharges by not requesting immediate service, thereby obtaining the copy at no additional cost (except for any transactional fees associated with the request). If the particular magazine, however, is in DEMAND and immediate DELIVERY requested, the pricing unit for a non-subscriber may be multiplied by two to account for the increased demand and a set fee, e.g., 25¢, added to forward the copy immediately. A subscriber under the same circumstances, however, may only incur the set fee. Alternatively, a graduated transmission fee schedule may apply for immediate, within 5 minutes, within an hour, etc. delivery. If a non-subscriber desires access to a short article in an old magazine, then VOLUME may indicate that articles under X bytes of data in length warrant halving the pricing unit, otherwise full price. A popularity factor may apply here to enhance the value of a particularly popular or useful article, e.g., 0.75 full magazine price.

In another example, a purchaser wishes to buy an item having a very low intrinsic value, e.g., a computer screen icon. The initial pricing unit value may be very small, e.g., 2¢ or fractions of a penny. Here, different dimensions may apply, e.g., DEMAND, QUALITY, PRIOR, where a higher quality icon, e.g., one incorporating movement or other enhanced features, may demand a premium. Again, DEMAND and PRIOR considerations may apply, as discussed. This example illustrates the usefulness of the present invention in the microtransactional context where small amounts of money are sought and even smaller transactional fees, e.g., 0.1¢ for the 2¢ icon, may be realized.

An additional example is where a purchaser wishes to analyze the rise and fall of a particular stock or families of stocks, on a weekly basis, over a period of years. The dimensional ordering here may be: DELIVERY, PRIOR, SAMPLE for each stock, where SAMPLE indicates that only a subset of items from the collection are needed. The multiplication value here may be a particular fraction associated with the values selected, e.g., ⅕ of the whole representing one of the five weekdays the stock market is open or some other value. Since the particular samples may have a higher intrinsic value than suggested by their placement within the database, e.g., all end of week stock values, the fraction associated therewith should be adjusted accordingly.

A further illustration of the aforedescribed valuation scheme of the present invention is in the offer and purchase of a song. The particular "data" in question is, for example, a just released song of an extremely popular band (DEMAND). Since the song may be part of a larger album or collection of songs, the value of that one song, possibly the only popular song on the album, should be more than the less popular songs but less than the entire album (VOLUME). Consequently, any album dimension should contain one or more factors directed to the popularity and enhanced value of the song. If the supplier bases the pricing model 20 on the song itself, then various pricing models may be implemented at the song level, as described. Since the song is new, the TIMELY dimension applies. If the particular buyer has a history (PRIOR) with the supplier, e.g., a frequent buyer who should get a discount, this should enter the equation. Of course, the aural quality (QUALITY) of the song will be important, particularly for a music connoisseur. Consequently, varying degrees of song quality may be offered. Further, if the song is available through multiple outlets, then the sixth factor COMPETITION factors in. Since immediate gratification may be key, immediate DELIVERY may be required with an enhanced price.

In a more elaborate example of an implementation of the system and method of the present invention, a high-end art dealer has over a period of years developed a database of various art pieces and associated prices. The antique dealer has published various show catalogs and has become well-known for their expertise in certain art periods and styles, particularly in ceramics and furniture. With the influx of the Internet into commerce, the antique dealer has decided to offer their knowledge and expertise for sale over the Internet, as well as their antique pieces, particularly using the system and method of the present invention. The "data" within the database includes prices which represent what the dealer believes the featured art pieces would fetch on the market. Historical background information about the pieces may also be included within the database. In a particular implementation of the invention, the data may be contained within a Microsoft Access database, which could also include photographs of the various art pieces, and particularly close-ups of craftsmen's markings on the articles, which would assist another dealer (purchaser) in establishing an appropriate value of the article or antique in question.

Figure 5:
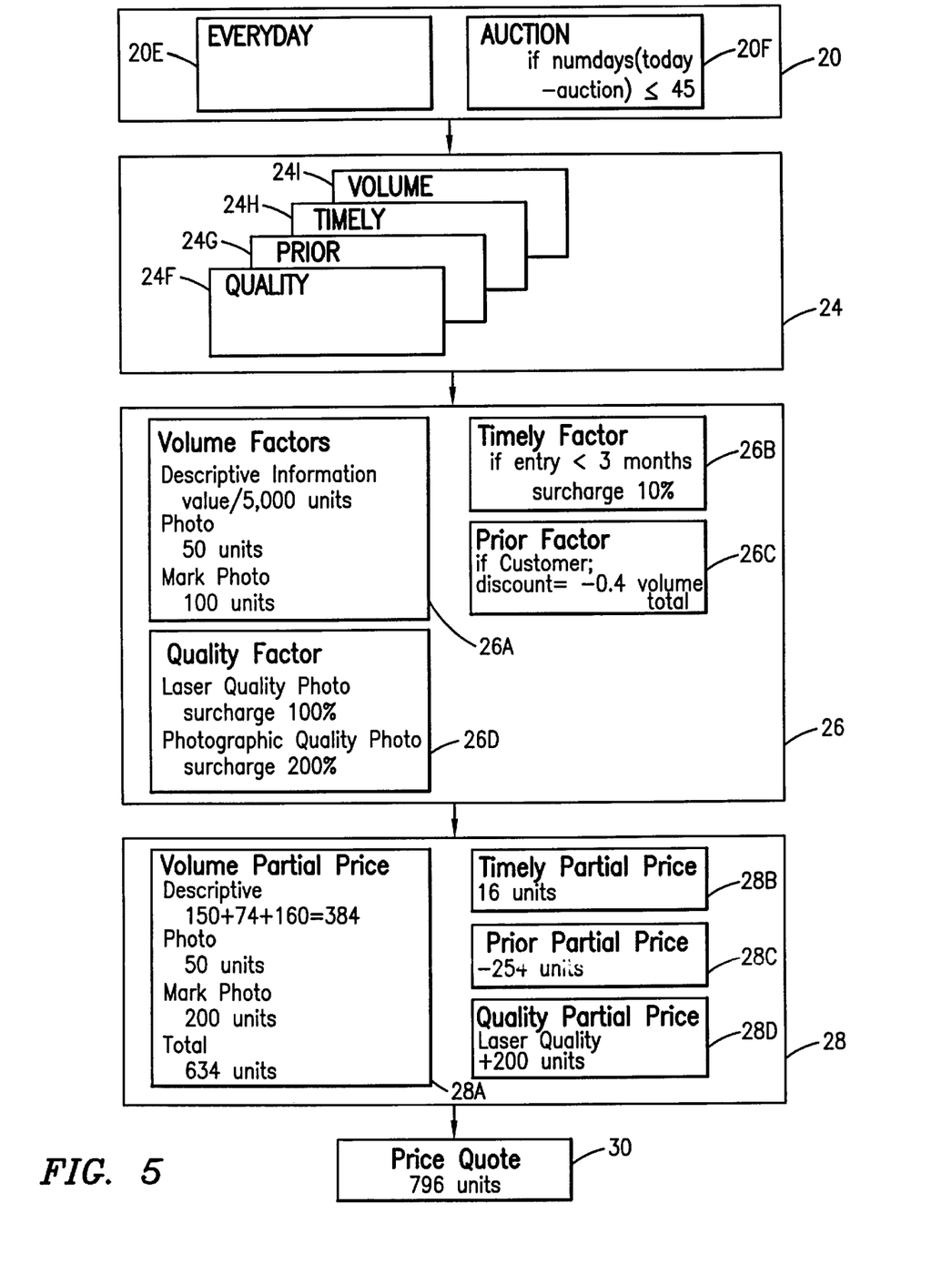
FIG. 5 is a schematic diagram further illustrating the system and method of the present invention shown in FIG. 2.

When configuring the pricing models for the respective art pieces, the antique dealer may establish two pricing models, e.g., models 20E and 20F as shown in FIG. 5, for a given article, such as ornamental Chinese teapots from the 1870's. Model 20E, for example, would handle day-to-day business, designated "everyday" in FIG. 5, and model 20F, designated "auction", would become active 45 days prior to any major auction of which the antique dealer is aware. It should be understood, of course, that the particular auction dates in question could be periodically updated.

With reference again to FIG. 5, the everyday pricing model 20E, which as discussed hereinbefore is instantiated at all times, utilizes four of the aforementioned dimensions, i.e., QUALITY (BOX 24F), PRIOR (box 24G), TIMELY (box 24H), and VOLUME (24I). In use, a customer wants, for example, to purchase the aforementioned antique dealer's background information about the Chinese ceramic teapots, e.g., in an effort to develop an appropriate bid for such items in an upcoming auction by that or another antique dealer. The dealer's database provides a comprehensive source for background information on the teapots in question, which could themselves sell for $5,000 to $10,000. Further, in this example the customer is interested in five specific teapots from that period and accessed the dealer's website for information.

Regarding the VOLUME dimension, in this example there are three distinct "kinds" of data for sale at the dealer's website: (1) descriptions, including prices, for various pieces of art and antiques, including the background information on the Chinese teapots, (2) photos of some of the aforementioned pieces and (3) photos of identification marks on those pieces which aid in authenticity and valuation determinations. In the aforesaid example, three factors, one for each type of data, is in effect for this tripartite dimension. With reference to box 26A in FIG. 5, the customer selects a particular data type, e.g., descriptive information, for pricing.

A first volumetric factor, descriptive background information on a particular item, is valued at $1/5000^{th}$ of the value of the associated price for the item, which, as discussed, is a part of the information available for that item in the database. Thus, if the value of the item in question is $7,500, the partial price (box 28 in FIG. 2) is $1.50 (or 150 pricing units). It should be understood that a transaction floor or minimum charge, e.g., 25 pricing units, may be accessed for any information request calculated out as less than 25 pricing units.

The second and third volume factors in the example are preferably fixed amounts, 50 and 100 pricing units, respectively, representing photos of the items and the pertinent identification marks.

The customer in the aforedescribed example may request information about three of the teapots, e.g., as illustrated on the dealer's website, the first teapot valued at $7,500, the second at $3,700 and the third at $8,000. As discussed, the cost of the descriptive information about the first teapot is 150 pricing units (7,500×100/5,000). The cost of like information about the other two teapots is 74 and 160 pricing units, respectively, as illustrated in FIG. 5 (volume factor box 26A). Similarly, the cost of a photo of one of the aforementioned teapots, if selected, is a flat 50 units and the cost of the photos of the identification marks on the other two teapots is 200 units. In the example shown in FIG. 5, the three descriptive information requests (150+74+160), one photo request (50) and two identification mark photos (200), totaling a partial price (box 28) of 634 pricing units, is illustrated in the various factors (box 26A) acting within the volumetric dimension.

Regarding freshness (TIMELY), this factor (box 26B) examines the last date that a price had been updated or the article in question had been sold. For example, if the last pricing information entered into the database was less than three months ago, then a surcharge of 10% of the aforementioned VOLUME pricing total is added. The rationale behind this computation is that the more current the price, the more comparable the price is to available merchandise and the more valuable the information. In the present example, one of the $8,000 teapots sold last month, indicating current pricing. Consequently, a 10% surcharge on the corresponding volumetric price of 160 pricing units, i.e., 16 units, is added for this factor.

Regarding the PRIOR dimension factor (box 26C), since maintaining a close relationship with prior customers is important in this (and most other industries), they offer a 40% discount on all VOLUME pricing. In the present example, a prior customer discount of 254 (40 k of 634) units is given, which as will be discussed constitutes a negative adjustment when computing the partial price.

Lastly, in the present example, the dimension QUALITY factor (box 26D) governs the quality of the images employed. For photographic quality images, for example, a 200% surcharge is assessed and, for laser-quality images, a 100% surcharge. No surcharge is accessed for normal, screen-quality images. In the present example, a customer purchasing the two identification marks at laser quality grade (an additional 200 pricing units) and a screen quality image of the $8,000 teapot (no charge), a quality-factor partial price (box 28D) is 200 pricing units (400 units if upgraded to photo quality).

With reference again to FIG. 5, the aforedescribed partial prices (boxes 28A–D) are added to determine the price quote (box 30). In the aforedescribed example, the price quote is 796, where the total VOLUME is +634, TIMELY +16, PRIOR −254 and QUALITY +200. Each of the above were set during configuration to be additive amounts. It should, nonetheless, be understood that configurations may differ. The conversion of the pricing units to a local currency, e.g., U.S. dollars, is at a particular rate, e.g., 0.75, resulting in a U.S. dollar total for this transaction at 597¢ or $5.97. This sum could readily be reduced by the customer by selecting, for example, a lower screen quality for viewing the photos of the identification marks.

In the aforedescribed manner, the seller, i.e., the antiques dealer, has selected a wide variety of variables in their pricing scheme so that the value of the objects referred to within the data is actually taken into account in the data pricing.

With reference again to FIG. 5, it should be understood that the other pricing model, model 20F for auction, is similarly configured, and as discussed, applicable when an auction is, for example, less than 45 days away. Here, however, only one dimension, EXPRESSION, is active. Within the expression language associated therewith, reference is made to the other "everyday" model, i.e., model 20E, but here the prices in model 20F are 1.5 times the everyday price quote, allowing the dealer to realize a 50% surcharge anytime quotes are made near auction times, which in the aforementioned example is 1194 units.

It should be understood that the system and method of the present invention is preferably utilized in the vending of information, particularly for facilitating the creation of an interface for an information vendor, allowing them to set up shop quickly and with a minimum of computer programming skills. To accomplish this goal, the preferred embodiment of the present invention employs a user-friendly graphical interface that simplifies the production of pricing models and allows the vendor to accomplish the heretofore difficult tasks of applying the aforementioned dimensional aspects (with factors).

It should be understood that an advantage of the data metering system and method described herein is purchaser anonymity. The data supplier need not know who bought the information unlike in most on-line transactions where credit information must change hands. Instead, the sales information may be maintained solely with the purchaser's system, e.g., in a cookie file which is activated again on a subsequent transaction with that supplier. It should be understood that the cookie or aplet file is preferably encrypted for security reasons.

A further benefit of the present invention is asynchronicity, i.e., ordering and purchasing need not go hand in hand. For example, a purchaser may request a price or quote on information through a web server, which would supply the quote. The purchaser's system, upon a subsequent authorization or ok, would then receive the information, e.g., downloaded to the purchaser's hard drive. The point of purchase, however, is when that data is accessed by the purchaser, which could be much later.

It should also be understood that in the implementation of the present invention, the determination of which dimensions apply in a given pricing model 20 may be made by reference to discrete variables, e.g., Boolean variables or bit flags where logical zero means that dimension (VOLUME =0) does not apply and logical one (VOLUME =1) means it does. Similarly, the set of dimensional parameters may be represented by a single variable or flag, bit fields within which may be set, e.g., bit 0 in the flag represents the aforementioned VOLUME. Additionally, the mathematical representation for the dimensions is preferably as an n-tuple, e.g., in the above 12-dimension example, n=12. In the n-tuple (1, 0, 0, 0, 0, 0, 0, 0, 1, 0, 0, 0), the dimensions VOLUME and EXTERNAL are set and the other ten are zero.

It should additionally be understood that code used to implement features of the present invention may be one or more of a variety of computer languages, preferably a language supporting a class structure, e.g., $C^{++}$, Java and the like.

It should also be understood that although the preferred data medium for use in the system and method of the present invention is digital, much legacy data, e.g., sound, scientific measurements, etc., may be in non-digital or analog form, requiring digitization. Conversion of such analog information into digital form may be performed at different sample rates and other conditions, and metered pursuant to the purchaser's wishes. Alternatively, through specialized hardware components, analog data may be utilized in its original analog formats metered by volume or other dimensions as described.

It should further be understood that the aforementioned first and second users of systems 10 and 16, respectively, preferably interact through a website interface such as on the Internet. It should nonetheless be understood that the system and method of the present invention may be used in non-web contexts, e.g., in private networks and the scope of the present invention should not be limited to Internet applications.

Finally, it should further be understood that the scope of the present invention covers not only the aforementioned system and method but also articles of manufacture employing computer readable program code for executing the method of the present invention, as well as program storage devices encoding the method of the present invention thereon.

The previous description is of preferred embodiments for implementing the invention, and the scope of the invention should not necessarily be limited by this description. The scope of the present invention is instead defined by the following claims.

What is claimed is:

1. A computer system for dynamically metering information during an information transaction between two users pursuant to a plurality of pricing models associated with said metered information, a first of said users being an information seller and the second of said two users being an information purchaser, said computer system comprising:

a database containing therein said plurality of pricing models associated with said metered information, said database further containing a multiplicity of dimensions, a plurality of said dimensions applicable to each of said pricing models, and a plurality of factors applicable to each of said dimensions;

an interface for said first user, accessible by said second user and offering said metered information to said second user, said second user selecting said metered information through said interface pursuant to at least one of said pricing models; and processing means for valuating said metered information pursuant to said at least one pricing model, said processing means dynamically applying said plurality of dimensions applicable to said at least one pricing model and dynamically applying said plurality of factors applicable to said plurality of applicable dimensions, generating a plurality of partial quotes associated with said at least one pricing model, and determining a price quote for said metered information pursuant to said at least one pricing model, wherein said multiplicity of dimensions associated with said metered information are selected from the group consisting of volume, freshness, prior dealings, enumeration, quality, competition, delivery, demand, external values, dynamic configuration, completeness and expression-based configuration.

2. A computer system according to claim 1, wherein said metered information is associated with an object, said price quote in said information transaction constituting a price quote for said object.

3. The computer system according to claim 1, wherein said computer system is networked, said first and second users having access to said computer system network.

4. The computer system according to claim 3, wherein said computer system network is the Internet.

5. The computer system according to claim 4, wherein said interface is a website interface on the Internet.

6. The computer system according to claim 3, wherein said computer system network is a private network.

7. The computer system according to claim 1, further comprising a fee setting device attached to said processing means, said fee setting device accessing a transaction fee for said metered information transaction.

8. The computer system according to claim 1, wherein said information is stored in said database.

9. The computer system according to claim 1, wherein said information is digital.

10. The computer system according to claim 1, wherein said information is analog.

11. The computer system according to claim 1, wherein at least one of said users is an intelligent agent or bot.

12. The computer system according to claim 1, wherein said information transaction is a microtransaction.

13. A method for metering information during an information transaction between two users pursuant to a plurality of pricing models associated with said metered information, a first of said users being an information seller and the second of said two users being an information purchaser, said two users employing a computer system for said information transaction, said computer system having a database containing said plurality of pricing models associated with said metered information, said database further containing a multiplicity of dimensions, a plurality of said dimensions applicable to each of said plurality of pricing models, and a plurality of factors applicable to each of said dimensions, said method comprising the steps of:

accessing, by said second user, said plurality of pricing models, dimensions and factors within said database associated with said metered information;

dynamically applying at least one of said pricing models and the respective plurality of applicable dimensions to said metered information transaction;

dynamically applying said plurality of factors applicable to said respective plurality of applicable dimensions to said metered information transaction;

generating a plurality of partial price quotes for said metered information, said partial price quotes being associated with said at least one pricing model, said respective plurality of associated dimensions and said respective plurality of associated factors; and determining, from said plurality of partial price quotes, a price quote for said metered information pursuant to said at least one pricing model accessing information, wherein said multiplicity of dimensions associated with said metered information are selected from the group consisting of volume, freshness, prior dealings, enumeration, quality, competition, delivery, demand, external values, dynamic configuration, completeness and expression-based configuration.

14. The method according to claim 13, wherein said metered information is associated with an object, said price quote in said step of determining constituting a price quote for said object.

15. The method according to claim 13, wherein said step of determining said price quote further comprises the step of:

accessing a transaction fee for said metered information transaction.

16. The method according to claim 15, wherein said transaction fee is included within said price quote.

17. The method according to claim 13, wherein said second user accesses said plurality of pricing models, dimensions and factors via a website interface of said first user within said computer system.

18. The method according to claim 13, wherein said information is stored in said database.

19. The method according to claim 13, wherein said information is digital.

20. The method according to claim 13, wherein said information is analog.

21. A program storage device readable by a machine and encoding a program of instructions for executing the method steps of a specified one of claims 13 to 20.

22. The program storage device according to claim 21, wherein said multiplicity of dimensions associated with said metered information are selected from the group consisting of volume, freshness, prior dealings, enumeration, quality, competition, delivery, demand, external values, dynamic configuration, completeness and expression-based configuration.

23. The method according to claim 13, wherein at least one of said users is an intelligent agent or bot.

24. The method according to claim 13, wherein said information transaction is a microtransaction.

25. An article of manufacture comprising a computer usable medium having computer readable program code means embodied thereon for causing a valuation or information pursuant to a plurality of pricing models, the computer readable program code means in said article of manufacture comprising:

computer readable program code means for causing a computer to access said pricing models from an associated database, dynamically apply a plurality of dimensions to each of said pricing models, dynamically apply a plurality of factors to each of said dimensions, generate a plurality of partial quotes associated with said plurality of price models, and determine a price quote for said information pursuant to at least one of said pricing models, wherein said multiplicity of dimensions associated with said metered information, are selected from the group consisting of volume, freshness, prior dealings, enumeration, quality, competition, delivery, demand, external values, dynamic configuration, completeness and expression-based configuration.

26. The article of manufacture according to claim 25, further comprising:

computer readable program code means for causing the computer to display the price quote on a display device.

27. A method for negotiating a price for metered information during an information transaction between two users and pursuant to a plurality of pricing models associated with said metered information, said method comprising the steps of:

accessing, by at least one of said users from a database, said plurality of pricing models, a respective plurality of dimensions being associated with each said pricing model;

dynamically applying at least one of said pricing models and the respective associated dimensions to said metered information;

generating a plurality of partial price quotes for said metered information, said partial price quotes being associated with said at least one pricing model and the respective associated dimensions; and determining, from said plurality of partial price quotes, a price quote for said metered information pursuant to said at least one pricing model;

wherein said respective plurality dimensions associated with said metered information are selected from the group consisting of volume, freshness, prior dealings, enumeration, quality, competition, delivery, demand, external values, dynamic configuration, completeness and expression-based configuration.

28. The method according to claim 27, wherein at least one of said users is an intelligent agent or bot.

* * * * *